(12) United States Patent
Benson et al.

(10) Patent No.: US 8,900,354 B2
(45) Date of Patent: Dec. 2, 2014

(54) BOOSTED NO-LANCE INJECTION SYSTEMS AND METHODS

(75) Inventors: Lewis B. Benson, Sewickley, PA (US); Brian S. Higgins, San Francisco, CA (US)

(73) Assignee: The Power Industrial Group Ltd., Derby (GB)

( * ) Notice: Subject to any disclaimer, the term of this patent is extended or adjusted under 35 U.S.C. 154(b) by 81 days.

(21) Appl. No.: 13/605,322

(22) Filed: Sep. 6, 2012

(65) Prior Publication Data

US 2013/0125749 A1    May 23, 2013

Related U.S. Application Data

(60) Provisional application No. 61/532,378, filed on Sep. 8, 2011.

(51) Int. Cl.

| B01D 53/02 | (2006.01) |
|---|---|
| B01D 53/83 | (2006.01) |
| B01D 53/12 | (2006.01) |
| F23J 15/00 | (2006.01) |
| F23J 7/00 | (2006.01) |
| B01D 53/90 | (2006.01) |

(52) U.S. Cl.
CPC .............. *B01D 53/12* (2013.01); *B01D 53/83* (2013.01); *B01D 2257/60* (2013.01); *B01D 2258/0283* (2013.01); *B01D 2251/404* (2013.01); *F23J 15/003* (2013.01); *F23J 7/00* (2013.01); *B01D 2257/2022* (2013.01); *B01D 2257/2047* (2013.01); *B01D 2257/2025* (2013.01); *B01D 2257/602* (2013.01); *B01D 2257/2045* (2013.01); *B01D 53/90* (2013.01); *B01D 2251/402* (2013.01); *B01D 2251/304* (2013.01); *B01D 2257/2042* (2013.01)

USPC .............. 96/150; 95/107; 110/203; 110/345; 423/210

(58) Field of Classification Search
USPC ........ 95/107; 96/150; 110/203, 345; 423/210
See application file for complete search history.

(56) References Cited

U.S. PATENT DOCUMENTS

| 4,842,834 | A | * | 6/1989 | Burton | 423/235 |
|---|---|---|---|---|---|
| 6,280,695 | B1 | * | 8/2001 | Lissianski et al. | 423/239.1 |
| 6,865,994 | B2 | * | 3/2005 | Seeker et al. | 110/345 |
| 7,363,867 | B2 | * | 4/2008 | Marx et al. | 110/345 |
| 7,404,940 | B2 |   | 7/2008 | Higgins et al. | 423/210 |
| 7,438,876 | B2 | * | 10/2008 | Cichanowicz | 423/210 |
| 7,854,911 | B2 |   | 12/2010 | Maziuk, Jr. | 423/243.01 |
| 8,043,587 | B2 | * | 10/2011 | Truce et al. | 423/210 |
| 8,449,288 | B2 | * | 5/2013 | Higgins | 431/11 |
| 2007/0163476 | A1 | * | 7/2007 | Comrie | 110/345 |
| 2008/0110381 | A1 | * | 5/2008 | Swanson et al. | 110/345 |
| 2009/0293721 | A1 | * | 12/2009 | Miller et al. | 95/107 |
| 2011/0045422 | A1 | * | 2/2011 | Tanca | 431/76 |

* cited by examiner

*Primary Examiner* — Christopher P Jones
(74) *Attorney, Agent, or Firm* — Morgan, Lewis & Bockius LLP (57) ABSTRACT

A boosted no-lance injection system (BNLS) and methods of operating a combustion system to reduce acid gas or metal emissions in the flue gas is shown and described. In one embodiment, a BNLS includes an injection device, a high volumetric flow air mover, a transport air mover, a sorbent hopper and a mounting apparatus. In other embodiments, a method of operating a combustion system includes positioning the BNLS to inject into the ductwork, applying transport air and sorbent into the ductwork, and applying the high volumetric flow air into the ductwork. The result is methods and systems for reducing acid or metal emissions in the flue gas.

53 Claims, 5 Drawing Sheets

BOOSTED NO-LANCE INJECTION SYSTEMS AND METHODS

This patent application claims the benefit of Provisional Application No. 61/532,378, filed Sep. 8, 2011, which is hereby incorporated in its entirety.

BACKGROUND

1. Field

The present inventions relate generally to systems and methods for reducing acid and metal emissions from combustion systems and, more particularly, to boosted no-lance injection systems and methods to reduce acid and metal emissions.

2. Related Art

Combustion systems having boilers are known in the art and can include, for example, pulverized coal plants, circulated fluidized beds, gas-fired systems, oil-fired systems, waste incinerators, direct-fired process heaters, kilns, tangentially-fired boilers, etc. Common elements of various combustion systems typically include a combustion chamber and a burner for igniting fuel located in the combustion chamber. Fuel (e.g. coal or biomass) is fed into the combustion chamber, where it is rapidly ignited and stabilized on burners. Any of a number of undesirable components included in the fuel, e.g. acid components or metal components, may enter the environment via flue gas exiting the stack and may cause any number of undesirable consequences. Examples of undesirable acid components in the flue gas include sulfur dioxide ($SO_2$), sulfur trioxide ($SO_3$), sulfuric acid ($H_2SO_4$), hydrogen chloride (HCl), hydrogen bromide (HBr), hydrogen fluoride (HF), chlorine ($Cl_2$) and bromine ($Br_2$). Examples of undesirable metal components in the flue gas include antimony (Sb), arsenic (As), beryllium (Be), cadmium (Cd), chromium (Cr), cobalt (Co), lead (Pb), manganese (Mn), mercury (Hg), nickel (Ni), and selenium (Se). The current state-of-art of dispersing or mixing solid sorbents into a flue gas for capture of acid gas and metal pollutants uses a plurality of injection lances.

Figure 1:
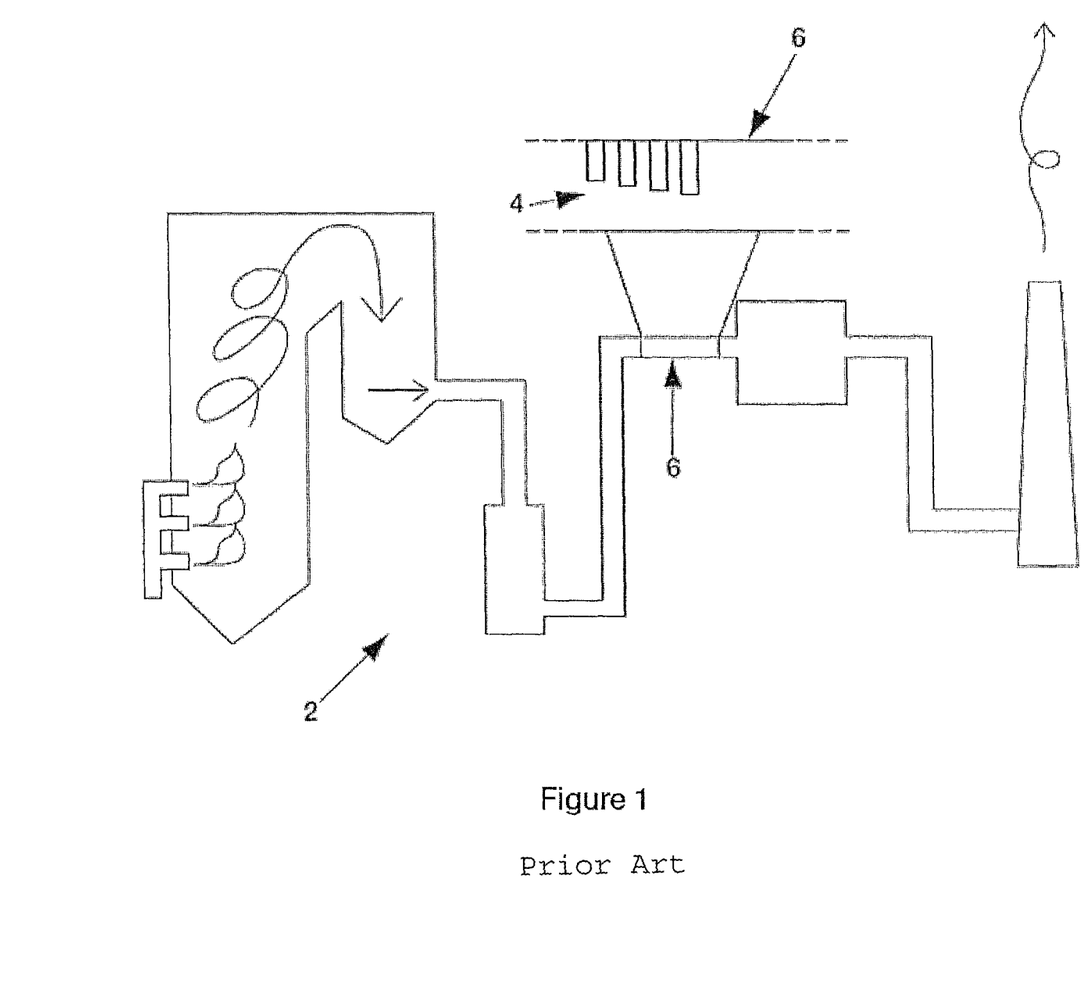
FIG. 1 illustrates an example of a combustion system utilizing a traditional lance-based system.

FIG. 1 illustrates one example of a combustion system referred to generally as system 2, using a traditional technique to reduce the emission of an acid component. In this example, the traditional technique is based on the use of several lances 4 extending deep into the ductwork 6 (enlarged for viewing) of system 2. Lances 4 are used to inject dry sorbent into flue gas traveling through ductwork 6, and can achieve some success at reducing undesirable components in the flue gas. Applicants, however, are generally dissatisfied with existing lance systems.

Applicants believe that lance systems can suffer from any number of problems, which Applicants would like to improve. For example, lance systems may warp over time because of heat exposure, thereby promoting clogging, adversely affecting sorbent dispersion, increased maintenance costs and prohibiting removal of the lance for maintenance without a unit outage. Further, lance systems may overheat the sorbent, thereby clogging the lance or reducing sorbent utilization. In addition, lance systems may fail to properly distribute sorbent for desired efficacy.

When a greater percentage of capture pollutants is desired, additional lances are often added in attempt to distribute the sorbent across the cross-section of the flue gas duct. Applicants believe this strategy creates additional problems. For example, as the number of injection lances increase, evenly distributing the sorbent to multiple injection lances becomes mechanically complex. The sorbent is transported to the vicinity of the flue gas duct by a limited number of air streams, for example one or two air streams. In order to provide multiple injection lances, a single transport air stream must be evenly divided into multiple streams. Such division suffers from an inability to divide the sorbent stream evenly, and the number of division points increases the likelihood of plugging with the solid sorbent downstream of the division points. Also, as the number of injection lances increases, the total amount of transport air used increases in proportion to the number of lances because a certain minimum velocity of air must be maintained within each lance to minimize likelihood of plugging with the solid sorbent, for example, a minimum of 15 m/s. This increased air flow load requires that the transport pipe, air blowers and associated blower air conditioning equipment size must be increased.

Further, lance systems may result in undesirable flue gas pressure drops because of the depth of penetration of the lances and numbers of the lances.

In-duct mixing devices, such as baffle plates, can also be used in conjunction with lance injection systems to increase mixing of sorbent and flue gas. However, Applicants believe that the application of in-duct mixing devices requires extended and unnecessary shutdown of the combustion unit for installation. Moreover, Applicants believe that in-duct devices cause a significant and unnecessary gas pressure loss, which permanently increase operating cost. Further, in-duct devices can also accumulate sorbent deposits or solids from the combustion system, thereby leading to shutdown of the combustion system for cleaning of the in-duct device.

These problems, Applicants believe, result in excessive or unnecessary maintenance, operational costs and offline requirements. Further, these problems may result in non-compliance with emissions regulations, and further increase costs and reduce power output.

Additionally, as illustrated in FIG. 1, for lances to perform effectively for a desired duration, lances are almost always need to be placed in a vertical orientation to reduce additional warping caused by gravity. Applicants are generally dissatisfied with the vertical orientation of lance systems, because Applicants believe the vertical orientation of lance systems place unnecessary constraints on system design, access, maintenance, and efficacy.

Accordingly, the present inventions are directed to at least one of these, or additional problems.

SUMMARY

The present inventions are directed to a variety of methods and systems for reducing acid or metal emissions in the flue gas. In one aspect of the present inventions, a method comprises providing a combustion system that emits a flue gas, obtaining at least one boosted no-lance injection system (BNLS), positioning the BNLS to inject into the ductwork; applying the transport air and the sorbent into the ductwork using the transport nozzle of the at least one BNLS; and applying the high volumetric flow air into the ductwork using the high volumetric flow nozzle of the at least one BNLS.

In another aspect, the present inventions are directed to a boosted no-lance injection system (BNLS). The BNLS is for interfacing with a ductwork of a combustion system. The combustion system may be free of an air heater, and the application by the BNLS may include application in an area having a flue gas temperature in the range of 250° F. and 850° F. Further, the system may include an air heater and the application area has a flue gas temperature in the range of 550° F. and 850° F. In yet other examples, the system includes an air heater wherein the application area has a flue gas temperature in the range of 250° F. and 450° F.

In other examples, the high volumetric flow air injection nozzle injects high volumetric flow air in the range of at least one of about 100 to about 3500 ACFM, about 150 to about 3500 ACFM, about 200 to about 3000 ACFM about 250 to about 2500 ACFM, about 300 to about 2500 ACFM, about 350 to about 2500 ACFM, about 400 to about 2500 ACFM, about 450 to about 2500 ACFM, about 500 to about 2500 ACFM, about 550 to about 2500 ACFM, about 600 to about 2500 ACFM, about 650 to about 2500 ACFM, about 700 to about 2500 ACFM, about 750 to about 2500 ACFM, about 800 to about 2500 ACFM, about 950 to about 2500 ACFM, and about 1000 to about 2000 ACFM. For instance, the volumetric flow air injection nozzle may inject high volumetric flow air in the range of 1000 to 2000 ACFM. Further, the system may include an ambient air supply and a recirculated flue gas supply.

In additional examples, the high volumetric flow air injection nozzle may inject high volumetric flow air at a temperature sufficient to promote calcination of the sorbent during a stage chosen from during transport, after transport, during injection, after injection and combinations thereof. The high volumetric flow air injection nozzle may inject high volumetric flow air at a rate in the range of 50 meters/second (m/s) to 150 m/s. Further, the high volumetric flow air injection nozzle may inject high volumetric flow air at a pressure in the range of 4 inches of water column (inWC) to 50 inWC. The high volumetric flow air injection nozzle may inject high volumetric flow air with a mass flow in the range of 3% and 5% of the total flue gas mass flow, wherein the 3% to 5% is divided across the number of BNLS injection devices applying high volumetric flow air.

The sorbent may include a plurality of solid particles that are generally configured to reduce the concentration of the acid or metal component. In some examples, the acid component includes $SO_2$, $SO_3$, $H_2SO_4$, HCl, HF, HBr, $Cl_2$, $Br_2$ and combinations thereof. Further, in some examples, metal component includes Hg, Se and combinations thereof. In certain examples, the sorbent is applied at a mass flow rate of X tons/hr and transport air is applied at a mass flow rate in the range of 0.5× tons/hr to 2× tons/hr and the transport velocity is more than 15 m/s. The sorbent solid particles may have a median maximum length in the range of 2 μm to 100 μm, preferably in the range of 5 μm to 40 μm, and more preferably in the range of 10 μm to 15 μm. The sorbent may include calcium carbonate, calcium hydroxide, sodium sesquicarbonate, sodium bicarbonate, trona, nacholite, magnesium oxide, magnesium hydroxide and powdered activated carbon. Further, the sorbent may be applied at a mass flow rate of X tons/hr and transport air is applied at a mass flow rate in the range of 0.5× tons/hr to 2× tons/hr and the transport velocity is more than 15 m/s.

In particular examples, the high volumetric flow air injection nozzle has a diameter in the range of 3 inches to 6 inches and the transport nozzle has a diameter in the range of 1.5 inches to 3 inches. The transport nozzle may be positioned within the high volumetric flow air injection nozzle. The transport nozzle may be positioned adjacent to the high volumetric flow air injection nozzle. The transport nozzle may terminate near the high volumetric flow air injection nozzle exit. Further, the transport nozzle may terminate up-stream from the high volumetric flow air injection nozzle exit. In some examples, the mounting apparatus positions the BNLS adjacent to the outer surface of the ductwork. The mounting apparatus may position transport nozzle in a non-vertical orientation. The mounting apparatus may position the transport nozzle in a non-vertical orientation. In particular examples, the high volumetric flow air is humidified. In yet other examples, the supply of high volumetric flow air includes recircualated flue gas.

In yet other examples, the ductwork includes an inner surface and an outer surface and is located downstream of a heat-transfer-to-water zone and upstream of a particle capture device. The BNLS comprises an injection device comprising a high volumetric flow air injection nozzle and a transport nozzle. A high volumetric flow air mover is configured to establish air-transport communication with the high volumetric flow air injection nozzle. A transport air mover is configured to establish air-transport communication with the transport nozzle. A sorbent hopper is configured to establish solid-particle communication with the transport nozzle. A mounting apparatus is configured to mount the injection device to the ductwork. In many examples, the mounting apparatus positions the terminus of the high volumetric flow air nozzle at a position P±1 inch relative to the inner surface of the ductwork. The transport nozzle may terminate at the same position as the high volumetric flow air nozzle. The transport nozzle may be extracted upstream into the high volumetric flow air nozzle, but only within the nozzle to the limit where the high volumetric flow air velocity is above about 15 m/s. The transport nozzle may be extended downstream of the high volumetric flow air nozzle (into the ductwork), but the sorbent utilization may quickly reduced as this distance is increased.

The above summary was intended to summarize certain embodiments of the present inventions. Systems and methods will be set forth in more detail, along with examples, in the figures and detailed description below. It will be apparent, however, that the detailed description is not intended to limit the present invention.

BRIEF DESCRIPTION OF THE FIGURES

Embodiments of the present inventions will be better understood by a reading of the Detailed Description of the Embodiments along with a review of the figures, in which.

DETAILED DESCRIPTION OF THE EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Many aspects of the present inventions relate generally to, inter alia, methods and systems for injecting into the ductwork of the combustion system. In one aspect, a method disclosed herein includes providing a combustion system.

Figure 2:
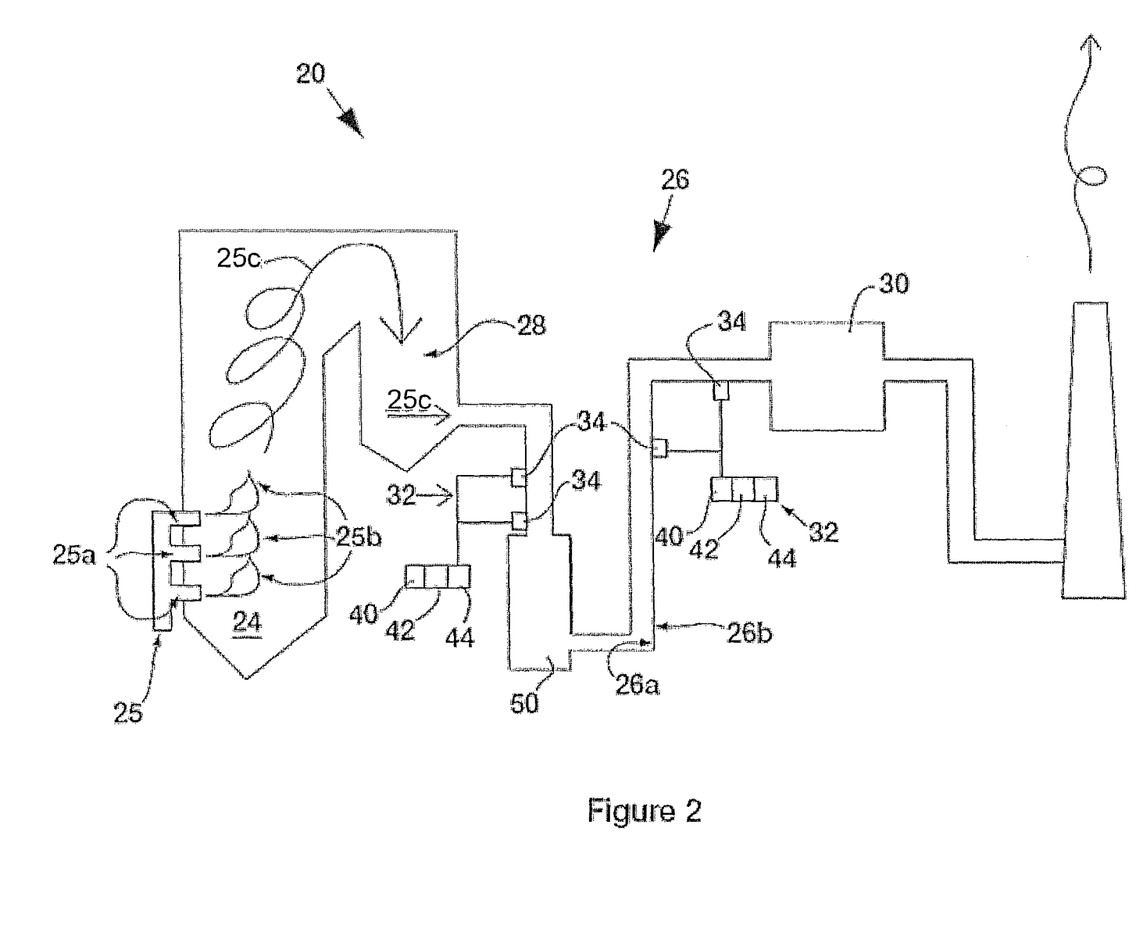
FIG. 2 is a schematic view of an example of a combustion system interfaced with at least one BNLS constructed according to the present inventions.

FIG. 2 illustrates an example of a combustion system 20 including combustion chamber 24. Fuel is injected into chamber 24 through feed 25, where it is ignited by burners 25a, thereby producing flame 25b and flue gas 25c. Flue gas 25c may contain any number of acid components, e.g. SO2, SO3, H2SO4, HCl, HF, HBr, Cl2, Br2 and the like, and metal components, e.g. Hg, Se and the like. Flue gas 25c is also considered to travel through ductwork 26 downstream of a heat-transfer-to-water zone 28 and upstream of a particle capture device 30, e.g. upstream of at least one of an electrostatic precipitator or a gas scrubbing device. Ductwork 26 includes an inner surface 26a and an outer surface 26b (also illustrated in additional figures).

As used herein, downstream from a heat-transfer-to-water zone includes zones downstream from at least one of an economizer, a generating bank, a super heat bank, a reheat bank, a drum and a water wall. In many examples, downstream from a heat-transfer-to-water zone will include the area downstream from the downstream-most of an economizer, a generating bank, a super heat bank, a reheat bank, a drum, and a water wall.

As used herein, upstream from a particle capture device includes the area upstream from the flue gas entrance of at least one particle collection device, for example, upstream from at least one of an electrostatic precipitator or a gas scrubbing device that may also serve as a particulate capture device, for example a wet scrubber including spray tower scrubbers, spray-tray tower scrubbers, venturi scrubbers, etc. Accordingly, upstream from a particle collection device can also include, for example, an area upstream from a gas scrubbing device and downstream from an electrostatic precipitator.

Providing a combustion system may vary from embodiment to embodiment. In some embodiments, providing includes constructing a combustion system. In other embodiments, providing includes locating a combustion system. In other embodiments, providing includes gaining access to a combustion system, e.g. for the purpose of installing a treatment system. In other embodiments, providing is achieved by operating a combustion system.

Figure 3:
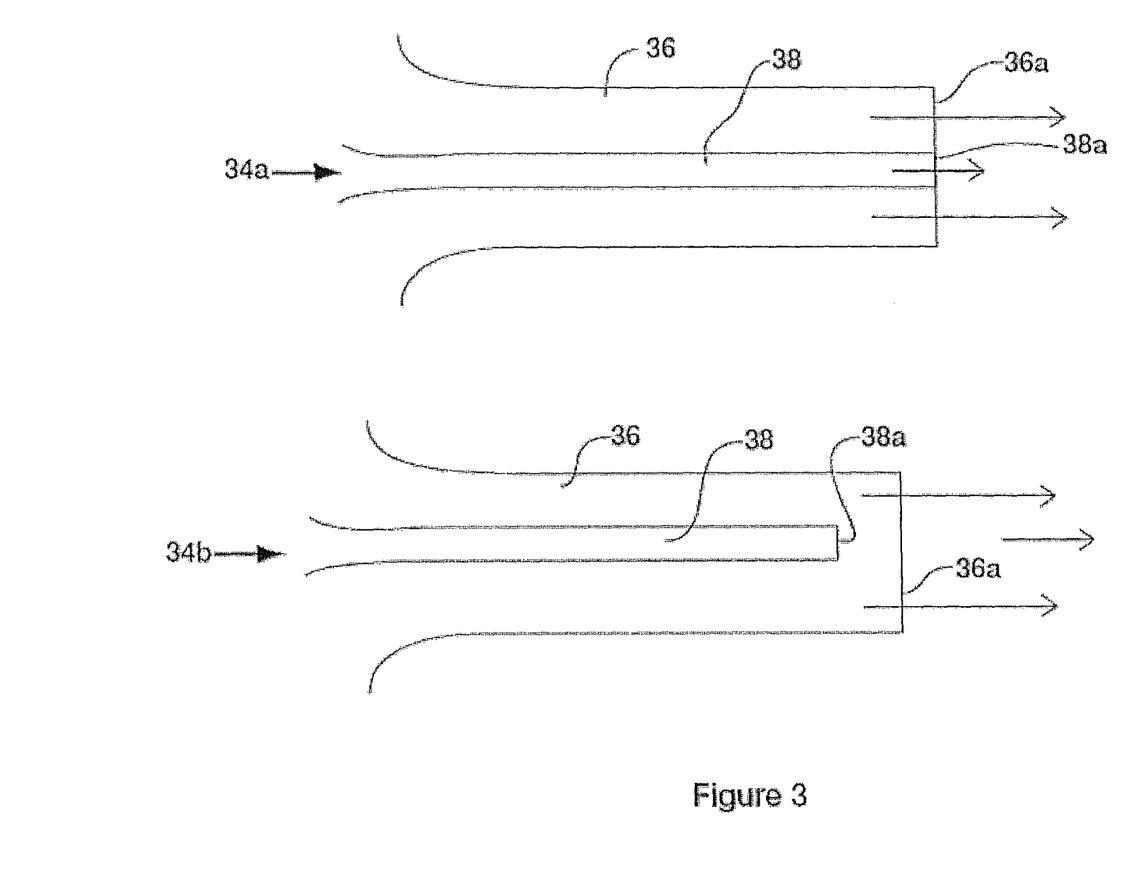
FIG. 3 is an isolated, side view of two examples of injection devices of a BNLS constructed according to the present inventions.
Figure 4:
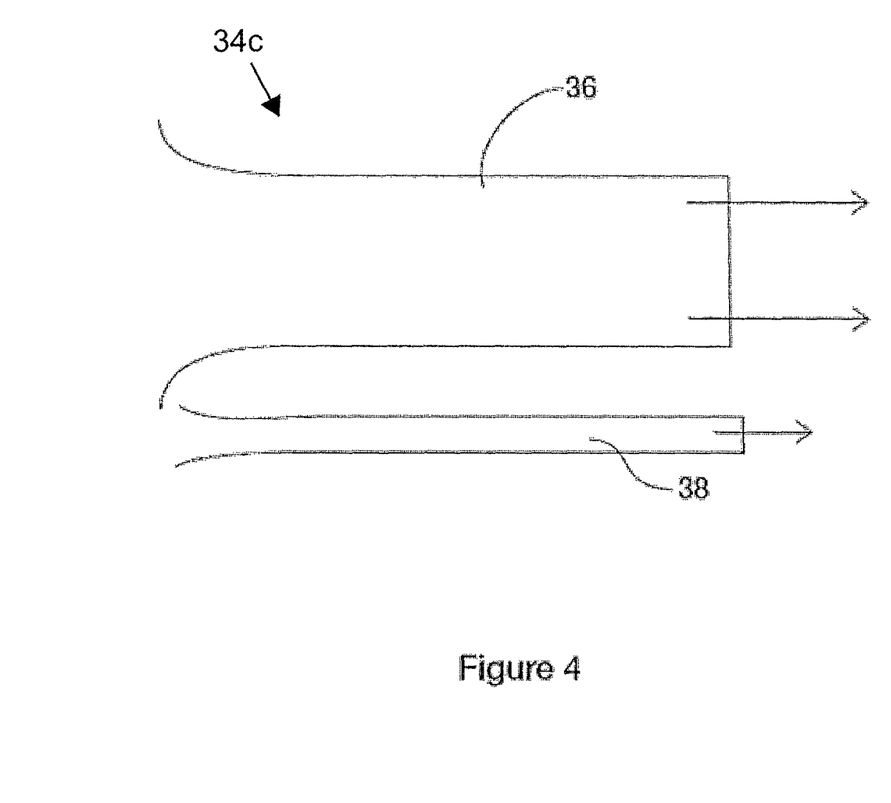
FIG. 4 is an isolated, side view of another example of an injection device.

In another aspect, a method includes obtaining at least one boosted no-lance injection systems (BNLS). FIG. 2 illustrates a pair of BNLS 32, each including includes a pair of injection devices 34. Injection devices 34 may be variable, and are illustrated in more detail in FIG. 3. Injection device 34a includes a high volumetric flow air injection nozzle 36 (also referred to herein as a high volumetric flow nozzle) for communication with a supply of high volumetric flow air (not shown in this figure) and a transport nozzle 38 for communication with a supply of transport air and a supply of sorbent (not shown in this figure). In injection device 34a, the transport nozzle 38 is positioned within, e.g. co-axially or non-co-axially, the high volumetric flow nozzle 36. The exit 38a of transport nozzle 38 terminates near the exit 36a of the high volumetric flow nozzle. If the transport nozzle terminates downstream of the exit of the high volumetric flow nozzle, the chemical utilization may be greatly reduced. Another example is illustrated in injection device 3b4. In device 34b, exit 38a of transport nozzle 38 terminates up-stream from exit 36a of the high volumetric flow nozzle 36. The transport air nozzle may be moved upstream, in some examples, up to the point where the high volumetric flow nozzle is convergent to increase velocity above 18 m/s. Further movement upstream can produce sorbent dropout, clogging and backpressure problems leading to undesirable unsteady sorbent transport. If the high volumetric flow air is hot, early (upstream) transport air nozzle termination might be desirable to induce calcination of the sorbent before entering the ductwork. FIG. 4 illustrates yet another example of an injection device, injection device 34c. In injection device 34c, transport nozzle 38 is positioned next to high volumetric flow nozzle 36. Dimensions of the injection devices may similarly be variable. For example, high volumetric flow air injection nozzle may have a diameter in the range of 3 inches to 6 inches. Transport nozzles may, by way of example, have a diameter in the range of 1.5 inches to 3 inches. Other examples include greater or lesser dimensions.

Referring back to FIG. 2, injection devices 34 are positioned to inject into ductwork 26 and are illustrated in communication with a supply of high volumetric flow air 40, a supply of transport air 42, and a supply of sorbent 44. The high volumetric air supply may be considered to be in communication with the high volumetric flow air injection nozzle, e.g. nozzle 36 in FIG. 3. The transport air supply and sorbent supply may be considered to be in communication with the transport nozzle, e.g. nozzle 38 in FIG. 3. During treatment of the flue gas, methods typically include applying the transport air and the sorbent into the ductwork using the transport nozzle of the at least one BNLS; and applying the high volumetric flow air into the ductwork using the high volumetric flow nozzle of the at least one BNLS.

The high volumetric air flow supply will typically include at least one air mover. Air movers may vary from embodiment to embodiment. In some embodiments, air movers are configured to generate a volumetric flow of about 50 to about 4000 actual cubic feet per minute (ACFM). High volumetric air flow may be applied from at least one of about 100 to about 3500 ACFM, about 150 to about 3500 ACFM, about 200 to about 3000 ACFM, about 250 to about 2500 ACFM, about 300 to about 2500 ACFM, about 350 to about 2500 ACFM, about 400 to about 2500 ACFM, about 450 to about 2500 ACFM, about 500 to about 2500 ACFM, about 550 to about 2500 ACFM, about 600 to about 2500 ACFM, about 650 to about 2500 ACFM, about 700 to about 2500 ACFM, about 750 to about 2500 ACFM, about 800 to about 2500 ACFM, about 950 to about 2500 ACFM, and about 1000 to about 2000 ACFM. In many embodiments, high volumetric flow will be chosen from about 1000 to about 2000 ACFM. A suitable air mover, by way of example, includes a 480 VAC, 15 horsepower blower. In many embodiments, air movers will be configured to generate an air flow velocity of about 80 m/s to about 15 m/s. Similarly, the application pressure of the high volumetric flow air may vary, for example in the range of 4 inches of water column (inWC) to 50 inWC.

In some examples, the high volumetric air flow may also be humidified, e.g. include any of entrained water droplets, mist, steam, etc. Humidification may be used, for example, to facilitate acid capture, e.g. the capture of halide acids.

Air movers may move ambient air, recirculated flue gas, or some combination thereof. Recirculated flue gas may be used, for example, to increase the temperature of the high volumetric air in an amount sufficient to promote calcination of the sorbent during or after transport, or during or after injection. It may also be used to reduce efficiency losses relative to using air alone.

In terms of mass flow, the high volumetric flow air will typically be applied with a mass flow in the range of 3% and 5% of the total flue gas mass flow, wherein the 3% to 5% is divided across the number of injectors applying high volumetric flow air. For example, in FIG. 2, each of the four injection devices 34 may have a mass flow of 0.8% to 1.2% of the total flue gas mass flow. Less high volumetric flow air can be used, but chemical utilization will be reduced.

The transport air supply may include a compressor, blower, etc. selected or adjusted based on the desired sorbent application rate. For example, transport air will typically be applied in the range of 0.5 to 2 times the mass flow rate of the sorbent. In one example, where sorbent is applied at 10 tons/hour, transport air will be applied at 10 tons/hour. Exit velocities and pressures may also vary. For example, transport air velocity is typically mandated to exceed 15 m/s in order to maintain sorbent transport and to inhibit sorbent fallout.

Regarding the sorbent, in most examples, the sorbent will include solid particles, e.g. solid particles of at least one of calcium carbonate, calcium hydroxide, sodium sesquicarbonate, sodium bicarbonate, trona, nacholite, magnesium oxide, magnesium hydroxide, powdered activated carbon and the like. Other examples of suitable sorbents include other compounds capable of removing the undesired acid components or metal components previously mentioned. Sorbent particle size may vary. Typically, sorbent solid particles will have a median maximum length in the range of 2 µm to 100 µm. In another example, median maximum length will be in the range of 5 µm to 40 µm, or 10 µm to 15 µm.

Application location of the high volumetric flow air, sorbent air, and sorbent may vary along the ductwork. For example, when combustion systems include an air heater, e.g. air heater 50, the application by at least one BNLS may include application into an area of the ductwork having a flue gas temperature in the range of 550° F. and 850° F., and being located downstream of heat-transfer-to-water zone 28 and upstream of air heater 50. In another example of a combustion system having an air heater, application may be to an area of the ductwork having a flue gas temperature in the range of 250° F. and 450° F., and being located downstream of air heater 50 and upstream of the particle capture device 30. In some embodiments, e.g. when the BNLS is applying downstream of an air heater, methods may additionally include heating the high volumetric air to an amount sufficient to promote calcination of the sorbent during or after transport or during or after injection. Heating may be achieved using recycled flue gas, an inline heater, air heater exit air, preheated combustion air, etc. The amount of temperature increase may vary depending on the calcination temperature and the temperature of the high volumetric air supply, e.g., increases in the range of 50° F. to 600° F. may be desired.

In some examples, application will also occur in combustion systems not having an air heater. Application in these examples may include application by at least one BNLS in an area having a flue gas temperature in the range of 250° F. and 850° F., and being downstream of a heat-transfer-to-water zone and upstream of a particle capture device.

Figure 5:
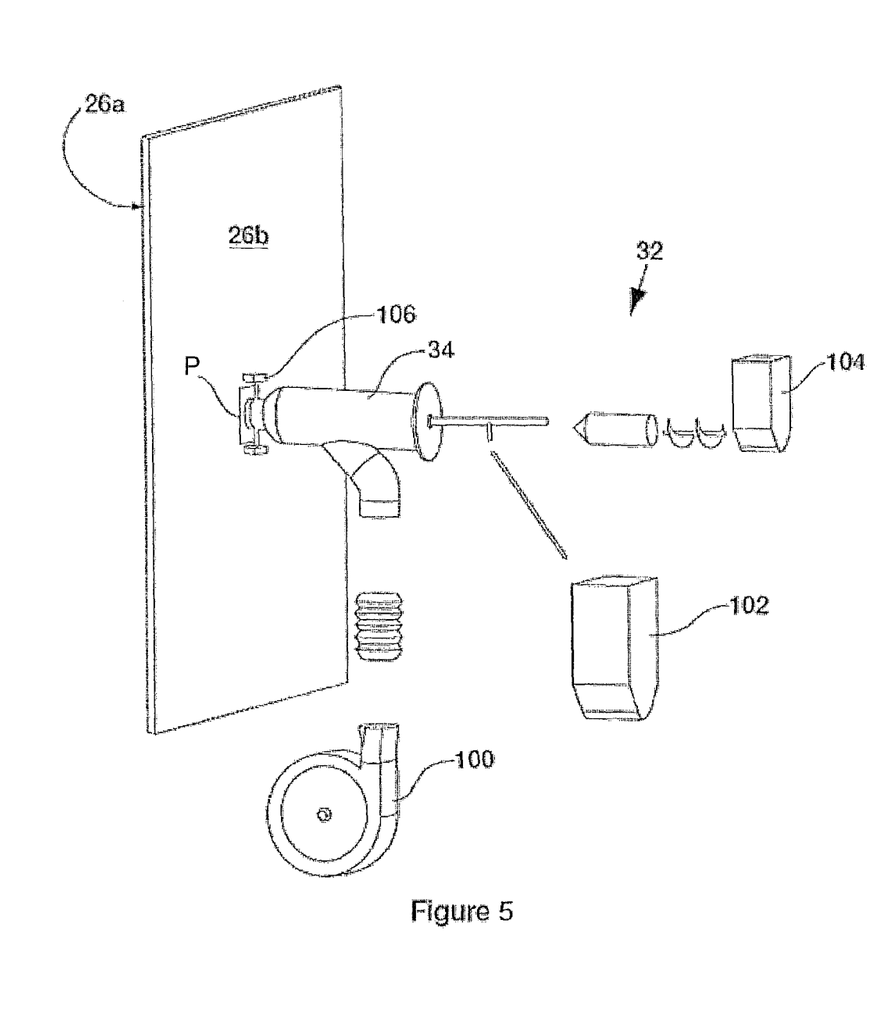
FIG. 5 a partially exploded, side perspective view of an injection device of a BNLS interfaced with ductwork, with elements removed for clarity.

FIG. 5 shows a close-up example of a BNLS as positioned. In this illustration, injection device 34 can be seen as mounted to the outer surface 26b of ductwork 26. The mounting illustrated may be considered adjacent to the outer surface ductwork. Similarly, if injection device 34 was mounted to a freestanding shelf, suspended beam, flange etc, it may be considered adjacent to the outer surface of the ductwork as used herein.

The exit of the injection device, e.g. either or both of exit 36a of the high volumetric flow air nozzle and exit 38a of the transport nozzle, is positioned at location P relative to the inner surface 26a of the ductwork. P can be, for example, ±10 inches, ±5 inches, or ±1 inches relative to the inner surface of the ductwork. In the example shown, the exit of the injection device does not extend inwardly of inner surface of the ductwork. Extending the nozzle into the ductwork will generally decrease the chemical utilization.

Further, it is clear from FIG. 5, that injection devices disclosed herein, and in particular transport nozzles, can be positioned in a non-vertical manner. As seen, in FIG. 5, device 34 is essentially in a horizontal orientation. Other exemplary parts of a BNLS example, are also illustrated in FIG. 5 including a high volumetric flow air mover 100, e.g. a blower, transport air mover 102, e.g. an air compressor, and a sorbent hopper 104. A mounting apparatus 106 is illustrated including a pair of arms for mounting to the ductwork wall. In other examples, the mounting apparatus may include a plate rigidly attached to the injector 34, which can be mounted to the ductwork wall.

Using systems and methods disclosed herein, Applicants believe any number of improvements in the art may be achievable. For example, the problems associated with lance heat exposure, e.g. warping, clogging, increased maintenance, going off-line, should be significantly improved as various systems and methods do not require penetration into the ductwork. Further, Applicants' systems and methods should decrease pressure drop relative to lance systems. Further, various systems and methods disclosed herein overcome the vertical-requirement design constraints of lance systems, thereby allowing for injecting in an increased number of locations and/or increased freedom of ductwork design.

Numerous characteristics and advantages have been set forth in the foregoing description, together with details of structure and function. The present inventions, however, is illustrative only, and changes may be made in detail, especially in matters of shape, size, and arrangement of parts, within the principle of the present inventions.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10, as well as all ranges beginning and ending within the end points, e.g. 2 to 9, 3 to 8, 3 to 9, 4 to 7, and finally to each number 1, 2, 3, 4, 5, 6, 7, 8, 9 and 10 contained within the range.

It is further noted that, as used in this specification, the singular forms "a," "an," and "the" include plural referents unless expressly and unequivocally limited to one referent.

We claim:

1. A boosted no-lance injection system (BNLS) for interfacing with a ductwork of a combustion system, the ductwork having an inner surface and an outer surface and being located downstream of a heat-transfer-to-water zone and upstream of a particle capture device, the BNLS comprising:
 (a) an injection device comprising
  (a1) a high volumetric flow air injection nozzle having a terminus for injection, and
  (a2) a transport nozzle having a terminus for injection;
 (b) a high volumetric flow air mover configured to establish air-transport communication with the high volumetric flow air injection nozzle;
 (c) a transport air mover configured to establish air-transport communication with the transport nozzle;

(d) a sorbent hopper configured to establish solid-particle communication with the transport nozzle; and (e) a mounting apparatus configured to mount the injection device to the ductwork, wherein the mounting apparatus positions the terminus of the transport nozzle at a position P±1 inch relative to the inner surface of the ductwork.

2. The system according to claim 1, wherein the combustion system is free of an air heater and wherein the application by the BNLS includes application in an area having a flue gas temperature in the range of 250° F. and 850° F.

3. The system according to claim 1, wherein the combustion system includes an air heater and wherein application by the BNLS includes application in an area having a flue gas temperature in the range of 550° F. and 850° F.

4. The system according to claim 1, wherein the combustion system includes an air heater and wherein application by the BNLS includes application in an area having a flue gas temperature in the range of 250° F. and 450° F.

5. The system according to claim 1, wherein the high volumetric flow air injection nozzle injects high volumetric flow air in the range of at least one of about 100 to about 3500 ACFM, about 150 to about 3500 ACFM, about 200 to about 3000 ACFM about 250 to about 2500 ACFM, about 300 to about 2500 ACFM, about 350 to about 2500 ACFM, about 400 to about 2500 ACFM, about 450 to about 2500 ACFM, about 500 to about 2500 ACFM, about 550 to about 2500 ACFM, about 600 to about 2500 ACFM, about 650 to about 2500ACFM, about 700 to about 2500 ACFM, about 750 to about 2500 ACFM, about 800 to about 2500 ACFM, about 950 to about 2500 ACFM, and about 1000 to about 2000 ACFM.

6. The system according to claim 1, wherein the high volumetric flow air injection nozzle injects high volumetric flow air in the range of 1000 to 2000 ACFM.

7. The system according to claim 1, including at least one of an ambient air supply and a recirculated flue gas supply.

8. The system according to claim 1, wherein the high volumetric flow air injection nozzle injects high volumetric flow air at a temperature sufficient to promote calcination of the sorbent during a stage chosen from during transport, after transport, during injection, after injection and combinations thereof.

9. The system according to claim 1, wherein the high volumetric flow air injection nozzle injects high volumetric flow air at a rate in the range of 50 meters/second (m/s) to 150 m/s.

10. The system according to claim 1, wherein the high volumetric flow air injection nozzle injects high volumetric flow air at a pressure in the range of 4 inches of water column (inWC) to 50 inWC.

11. The system according to claim 1, wherein the high volumetric flow air injection nozzle injects high volumetric flow air with a mass flow in the range of 3% and 5% of the total flue gas mass flow, wherein the 3% to 5% is divided across the number of BNLS injection devices applying high volumetric flow air.

12. The system according to claim 1, wherein the sorbent includes a plurality of solid particles configured to reduce the concentration of the acid or metal component.

13. The system according to claim 12, wherein the acid component includes an acid chosen from $SO_2$, $SO_3$, $H_2SO_4$, HCl, HF, HBr, $Cl_2$, $Br_2$ and combinations thereof.

14. The system according to claim 12, wherein the metal component includes a metal chosen from Hg, Se and combinations thereof.

15. The system according to claim 1, wherein the sorbent is applied at a mass flow rate of × tons/hr and transport air is applied at a mass flow rate in the range of 0.5× tons/hr to 2× tons/hr and the transport velocity is more than 15 m/s.

16. The system according to claim 1, wherein the sorbent solid particles have a median maximum length in the range of 2 μm to 100 μm, preferably in the range of 5 μm to 40 μm, and more preferably in the range of 10 μm to 15 μm.

17. The system according to claim 1, wherein the sorbent includes at least one sorbent chosen from calcium carbonate, calcium hydroxide, sodium sesquicarbonate, sodium bicarbonate, trona, nacholite, magnesium oxide, magnesium hydroxide, and powdered activated carbon.

18. The system according to claim 1, wherein the sorbent is applied at a mass flow rate of × tons/hr and transport air is applied at a mass flow rate in the range of 0.5× tons/hr to 2× tons/hr and the transport velocity is more than 15 m/s.

19. The system according to claim 1, wherein the high volumetric flow air injection nozzle has a diameter in the range of 3 inches to 6 inches and the transport nozzle has a diameter in the range of 1.5 inches to 3 inches.

20. The system according to claim 1, wherein the transport nozzle is positioned within the high volumetric flow air injection nozzle.

21. The system according to claim 1, wherein the transport nozzle is positioned adjacent to the high volumetric flow air injection nozzle.

22. The system according to claim 1, wherein the transport nozzle terminates near the high volumetric flow air injection nozzle exit.

23. The system according to claim 1, wherein the transport nozzle terminates up-stream from the high volumetric flow air injection nozzle exit.

24. The system according to claim 1, wherein the mounting apparatus positions the BNLS adjacent to the outer surface of the ductwork.

25. The system of claim 1, wherein the mounting apparatus positions the transport nozzle in a non-vertical orientation.

26. The system according to claim 1, wherein the mounting apparatus positions the transport nozzle in a non-vertical orientation.

27. The system according to claim 1, wherein the high volumetric flow air is humidified.

28. The method according to claim 1, wherein the supply of high volumetric flow air includes recirculated flue gas.

29. A method of operating a combustion system to reduce acid gas or metal emissions in the flue gas, the method comprising the steps of:

(a) providing a combustion system that emits a flue gas containing an acid gas or metal component, wherein the combustion system includes a ductwork downstream of a heat-transfer-to-water zone and upstream of a particle capture device, the ductwork having an inner surface and an outer surface;

(b) obtaining at least one boosted no-lance injection system (BNLS) according to claim 1;

(c) positioning the at least one BNLS to inject into the ductwork;

(d) applying the transport air and the sorbent into the ductwork using the transport nozzle of the at least one BNLS; and (e) applying the high volumetric flow air into the ductwork using the high volumetric flow nozzle of the at least one BNLS.

30. The method according to claim 29, wherein the combustion system does not include an air heater, said method including applying the at least one BNLS in an application area having a flue gas temperature in the range of 250° F. and 850° F. and downstream of a heat-transfer-to-water zone and upstream of a particle capture device.

31. The method according to claim 29, wherein the combustion system includes an air heater, said method including applying the at least one BNLS in an application area having a flue gas temperature in the range of 550° F. and 850° F. and downstream of a heat-transfer-to-water zone and upstream of the air heater.

32. The method according to claim 29, wherein the combustion system includes an air heater, said method including applying the at least one BNLS in an application area having a flue gas temperature in the range of 250° F. and 450° F. and downstream of the air heater and upstream of the particle capture device.

33. The method according to claim 32, further including using heated high volume air when the sorbent is applied to the area of the ductwork downstream from the air heater.

34. The method according to claim 29, including applying the high volumetric flow air in the range of at least one of about 100 to about 3500 ACFM, about 150 to about 3500 ACFM, about 200 to about 3000 ACFM about 250 to about 2500 ACFM, about 300 to about 2500 ACFM, about 350 to about 2500 ACFM, about 400 to about 2500 ACFM, about 450 to about 2500 ACFM, about 500 to about 2500 ACFM, about 550 to about 2500 ACFM, about 600 to about 2500 ACFM, about 650 to about 2500 ACFM, about 700 to about 2500 ACFM, about 750 to about 2500 ACFM, about 800 to about 2500 ACFM, about 950 to about 2500 ACFM, and about 1000 to about 2000 ACFM.

35. The method according to claim 29, including applying the high volumetric flow air in the range in the range of 1000 to about 2000 ACFM.

36. The method according to claim 29, wherein the supply of high volumetric flow air includes at least one of an ambient air supply and a recirculated flue gas supply.

37. The method according to claim 29, wherein the supply of high volumetric flow air has a temperature sufficient adapted for promoting calcination of the sorbent at a stage chosen from during transport, after transport, during injection, after injection and combinations thereof.

38. The method according to claim 29, including applying the high volumetric flow at a rate in the range of 50 meters/second (m/s) to 150 m/s.

39. The method according to claim 29, including supplying the high volumetric flow air at a pressure in the range of 4 inches of water column (inWC) to 50 inWC.

40. The method according to claim 29, including applying high volumetric flow air with a mass flow in the range of 3% and 5% of the total flue gas mass flow, wherein the 3% to 5% is divided across the number of BNLS injection devices applying high volumetric flow air.

41. The method according to claim 29, wherein the sorbent includes a plurality of solid particles configured to reduce the concentration of the acid or metal component.

42. The method according to claim 41, wherein the acid component includes an acid chosen from $SO_2$, $SO_3$, $H_2SO_4$, HCl, HF, HBr, $Cl_2$, $Br_2$ and combinations thereof.

43. The method according to claim 41, wherein the metal component includes a metal chosen from Hg, Se and combinations thereof.

44. The method according to claim 29, wherein the sorbent solid particles have a median maximum length in the range of 2 μm to 100 μm, preferably in the range of 5 μm to 40 μm, and more preferably in the range of 10 μm to 15 μm.

45. The method according to claim 29, wherein the sorbent includes at least one sorbent chosen from calcium carbonate, calcium hydroxide, sodium sesquicarbonate, sodium bicarbonate, trona, nacholite, magnesium oxide, magnesium hydroxide, and powdered activated carbon.

46. The method according to claim 29, wherein the sorbent is applied at a mass flow rate of × tons/hr and transport air is applied at a mass flow rate in the range of 0.5× tons/hr to 2× tons/hr and the transport velocity is more than 15 m/s.

47. The method according to claim 29, wherein the high volumetric flow air injection nozzle has a diameter in the range of 3 inches to 6 inches and the transport nozzle has a diameter in the range of 1.5 inches to 3 inches.

48. The method according to claim 29, wherein the transport nozzle is positioned within (or next to) the high volumetric flow air injection nozzle and terminates near the high volumetric flow air injection nozzle exit, or terminates upstream from the high volumetric flow air injection nozzle exit.

49. The method according to claim 29, wherein positioning the at least one BNLS includes mounting at least part of the at least one BNLS adjacent to the outer surface of the ductwork.

50. The method according to claim 29, wherein positioning the at least one BNLS includes positioning the exit of the BNLS at a position P±1 inch relative to the inner surface of the ductwork.

51. The method according to claim 50, wherein positioning the at least one BNLS includes positioning the exit of the BNLS such that it does not extend inwardly of the inner surface of the ductwork.

52. The method according to claim 29, wherein positioning the at least one BNLS includes positioning the transport nozzle in a non-vertical orientation.

53. The method according to claim 29, including humidifying the high volumetric flow air.

* * * * *